Figure 1:
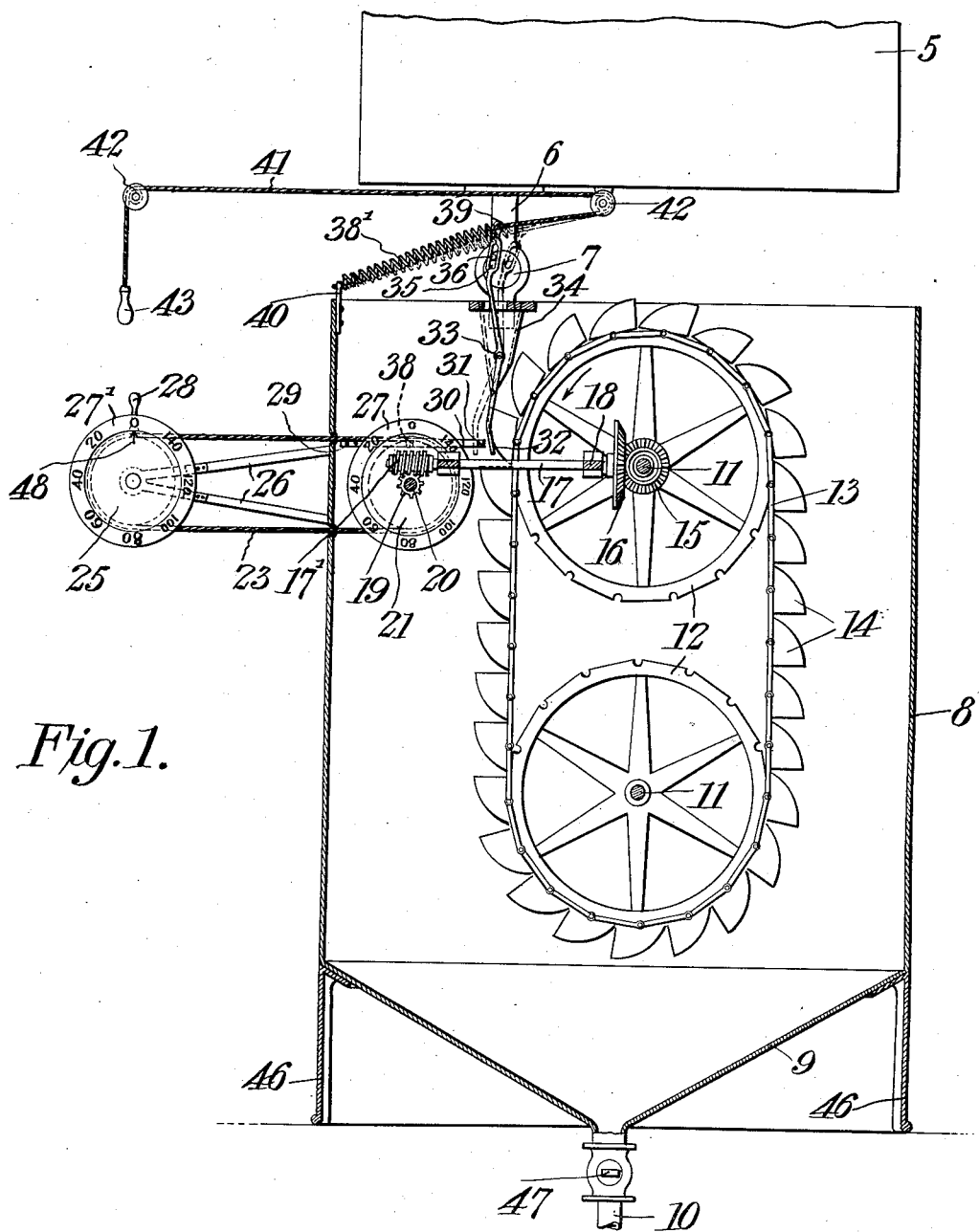

No. 857,996. PATENTED JUNE 25, 1907.
F. O. HAGUE.
LIQUID WEIGHING OR MEASURING MACHINE.
APPLICATION FILED OCT. 2, 1906.
2 SHEETS—SHEET 2.
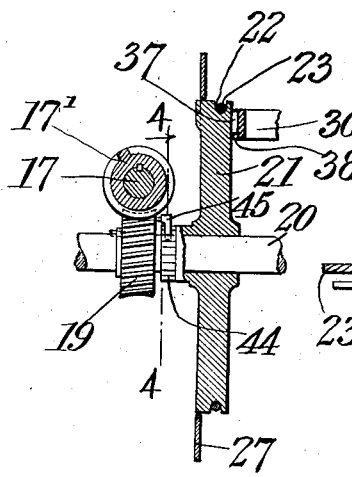
Fig. 2.
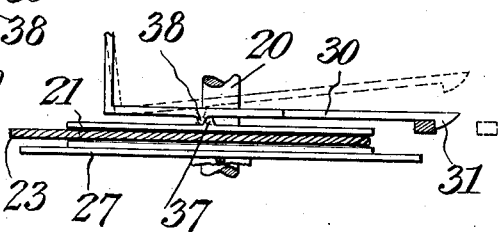
Fig. 3.
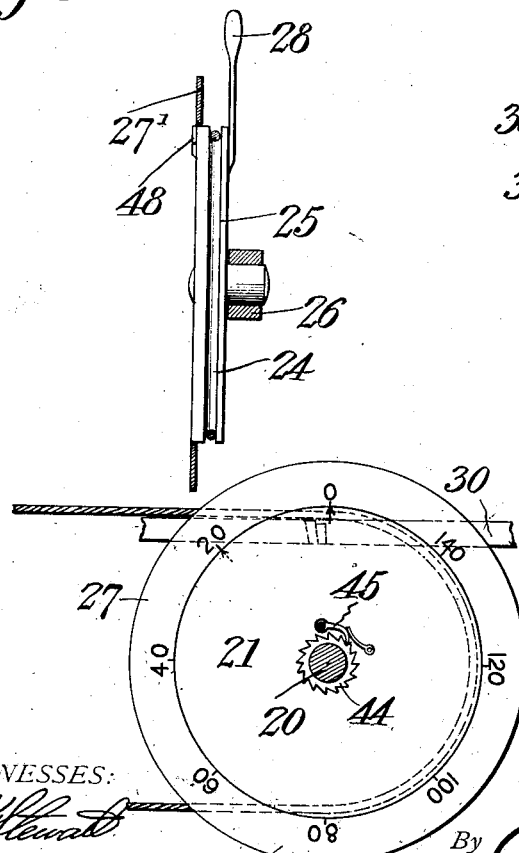
Fig. 5.
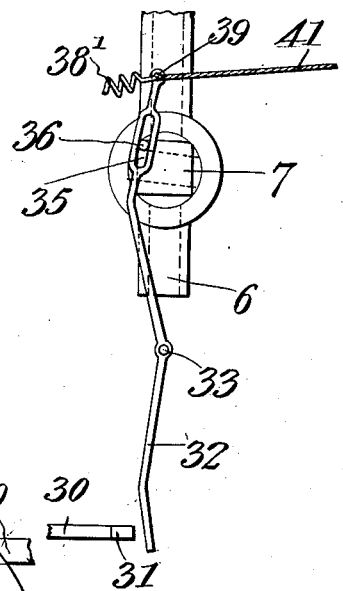
Fig. 6.
Fig. 4.
Frank O. Hague
INVENTOR
WITNESSES:
ATTORNEYS

UNITED STATES PATENT OFFICE.

FRANK O. HAGUE, OF HORNELL, NEW YORK, ASSIGNOR OF ONE-HALF TO FRANK J. NELSON, OF HORNELL, NEW YORK.

LIQUID WEIGHING OR MEASURING MACHINE.

No. 857,996.     Specification of Letters Patent.     Patented June 25, 1907.

Application filed October 2, 1906. Serial No. 337,087.

*To all whom it may concern:*

Be it known that I, FRANK O. HAGUE, a citizen of the United States, residing at Hornell, in the county of Steuben and State of New York, have invented a new and useful Liquid Weighing or Measuring Machine, of which the following is a specification.

This invention relates to machines for weighing or measuring milk and other liquids and has for its object to provide means whereby a pre-determined quantity of liquid may be withdrawn from a storage-tank or reservoir and accurately and conveniently measured without the employment of the usual graduated vessels or measures.

A further object of the invention is to provide means for automatically controlling the supply of liquid from the storage-tank and means for indicating the quantity of liquid withdrawn from said tank.

A further object is to provide an endless belt or chain having a plurality of buckets secured thereto and actuated by the weight of the milk for rotating the same, said belt being operatively connected with a disk or wheel arranged in the path of the valve-operating lever and adapted to actuate the latter for moving the valve to closed position.

A still further object of the invention is to generally improve this class of devices so as to increase their utility, durability and efficiency.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a vertical sectional view of a liquid-measuring machine constructed in accordance with my invention. Fig. 2 is a vertical sectional view of the rotating disk and associated parts. Fig. 3 is a top plan view of the same. Fig. 4 is a vertical sectional view taken on the line 4—4 of Fig. 2 and looking in the direction of the arrow indicated in Fig. 2. Fig. 5 is a vertical sectional view partly in elevation of the indicating dial. Fig. 6 is a side elevation of the valve and cut-off lever.

Similar numerals of reference indicate corresponding parts in all of the figures of the drawings.

In carrying the invention into effect there is provided a storage-tank 5 adapted to receive the skimmed milk or other liquid to be dispensed, said tank being provided with a depending pipe 6 having a valve 7 mounted for rotation therein for controlling the supply of liquid from the storage-tank. Arranged below the storage-tank 5 is a receiving tank 8 having an inclined bottom 9 terminating in a discharge nozzle 10 for drawing off the liquid after the same has been measured.

Arranged within the receiving tank 8 and journaled on suitable stub-shafts 11 are sprocket-wheels 12 on which is mounted for rotation a sprocket chain 13 carrying a plurality of buckets 14 adapted to receive the milk or other liquid from the storage-tank after the latter is discharged through the pipe 6.

Secured to or formed integral with the upper sprocket-wheel 12 is a beveled gear 15 which meshes with a corresponding beveled gear 16 secured to one end of a horizontally disposed shaft 17, the latter being mounted in suitable bearings 18 extending laterally from the side walls of the receiving-tank 8. Keyed to the opposite end of the shaft 17 is a worm 17′ which meshes with a worm-wheel 19 secured to and mounted for rotation with the stub-shaft 20. Loosely mounted on the shaft 20 is a wheel or disk 21 having its periphery formed with an annular groove 22 for the reception of a belt or cable 23, the latter being seated in a similar groove 24 formed in a corresponding disk or wheel 25 mounted for rotation on a bracket 26 fastened in any suitable manner to the exterior walls of the receiving-tank 8, as shown. Surrounding the wheels or disks 21 and 25 are stationary collars or rings 27 and 27′ each having stamped or otherwise printed on the face thereof a plurality of graduations indicating the different quantities of milk either in pints or pounds to be withdrawn from the storage-tank.

The disk 25 is provided with a suitable operating handle 28 whereby said disk may be rotated so as to impart a corresponding movement to the disk 21.

Secured to the interior walls of the tank 8 in any suitable manner as by screws or similar fastening devices 29 is one end of a spring locking lever 30 the opposite end of which is disposed parallel with the rear face of the disk 21 and is provided with a terminal catch 31 for engagement with the adjacent end of a cut-off lever 32. The cut-off lever 32 is pivoted at 33 to a spout or nozzle 34 arranged within the tank 8 and is provided at its upper end with an elongated slot 35 adapted to receive a lug 36 extending laterally from the valve 7 whereby when the cut-off lever is tilted the valve will be moved to open and closed position.

The catch 31 extends in the path of movement of the lower or free end of the cut-off lever 32 so that when the latter is tilted the catch 31 will engage said lever and lock the same in open position.

Extending laterally from the rear face of the disk 21 is a cam 37 which engages a similar cam or lug 38 extending inwardly from the spring locking lever 30 and serves to move the locking lever 30 laterally to the dotted line position shown in Fig. 3 of the drawing thereby releasing the cut-off lever and permitting the spring 38 to tilt the lever and automatically close the valve. One end of the spring 38' is secured to an eye 39 formed in the slotted end of the cut-off lever while the opposite end thereof is secured to an arm 40 extending vertically above the receiving tank 8.

As a means for manually opening the valve there is provided a cord or cable 41 one end of which is attached to the eye 39 while the opposite end thereof passes over alined pulleys 42 and is provided with a terminal handle 43 so that by exerting a downward pull on the handle 43 the cut-off lever will be moved laterally against the tension of the spring 34 and into engagement with the catch 31 on the spring locking lever 30.

Secured to or formed integral with the wheel or disk 21 is a ratchet-wheel 44 which engages a pawl 45 pivotally mounted on the worm-wheel 19. It will thus be seen that when the disk 25 is rotated to indicate the desired quantity of milk to be withdrawn from the storage-tank the pawl 45 will ride freely over the teeth on the ratchet 44 and thus permit the disk to be set without effecting the endless conveyer and when the conveyer is rotated the pawl 45 will engage the ratchet 44 and thus key the disk 21 to the shaft 20 and cause a corresponding movement to be imparted to said disk.

The receiving tank 8 is preferably provided with supporting legs 46 and a suitable cock 47 is mounted in the pipe 10 for regulating the quantity of milk discharged from said tank.

The operation of the device is as follows: When it is desired to withdraw, say twenty pints or pounds of milk from the storage-tank 5 the disk 25 is rotated by means of a handle 28 until the arrow or pointer 48 registers with the numeral 20, a corresponding movement being imparted to the disk 21 through the medium of the belt 22 as before stated. The operator then grasps the handle 43 and exerts a downward pull on the cord 41 which moves the cut-off lever 32 against the tension of the spring 34 so as to cause the lower or free end thereof to engage the catch 31 and in which position the valve will be opened thus permitting the milk or other liquid in the storage-tank to flow through the valve and discharge nozzle 34 into buckets on the endless belt. The weight of the milk in the buckets 14 will rotate the belt and through the medium of the gearing rotate the disk 21 in the direction of the arrow indicated in Fig. 4 of the drawings. As the disk 21 rotates the cam or lug 37 will engage the corresponding cam or lug 38 on spring locking lever 30 thereby tilting the latter to the dotted line position shown in Fig. 3 and releasing the cut-off lever 32 so that the spring 38' will automatically close the valve and cut off the supply of milk from the storage-tank. When the lug or cam 37 clears the lug 38 the spring action of the locking lever 30 will automatically return said lever to the full line position shown in Fig. 3 of the drawings and in which position the catch 31 will again engage the cut-off lever and lock the same in open position when the cable 41 is operated. As the endless chain or belt rotates the contents of the buckets will be discharged into the hopper or inclined end of the receiving-tank 8 from which it may be conveniently withdrawn through the valve 47.

From the foregoing description it is thought that the construction and operation of the device will be readily understood by those skilled in the art and further description thereof is deemed unnecessary.

Having thus described the invention what is claimed is:

1. In a measuring machine, a storage-tank, a receiving tank, a valve for controlling the liquid in the storage-tank, a cut-off lever operatively connected with the valve, and a flexible endless conveyer actuated by the weight of the liquid for automatically tripping the cut-off lever thereby to close the valve.

2. In a measuring machine, a storage tank a receiving tank, a valve for controlling the liquid in the storage-tank, a cut-off lever operatively connected with the valve, a flexible endless conveyer mounted for rotation in the receiving tank and actuated by the weight of the liquid for automatically tripping the cut-off lever thereby to close the valve, and means for manually moving the valve to open position.

3. In a measuring machine, a storage-tank, a receiving-tank, a valve for controlling the flow of liquid from the storage-tank to the receiving tank, a cut-off lever operatively connected with the valve, and a flexible endless conveyer arranged within the receiving-tank and actuated by the weight of the liquid for automatically tripping the cut-off lever thereby to close the valve.

4. In a measuring machine, a storage-tank, a receiving-tank, a valve for controlling the flow of liquid in the storage-tank, a cut-off lever operatively connected with the valve, tripping mechanism for automatically moving the valve to closed position, a flexible endless conveyer disposed within the receiving tank for operating the tripping mechanism, and means for moving the valve to open position.

5. In a measuring machine, a storage-tank, a receiving-tank, a valve for controlling the liquid in the storage-tank, a cut-off lever operatively connected with the valve, tripping mechanism for automatically closing the valve, an endless belt arranged within the receiving-tank and operated by the weight of the liquid for actuating the tripping mechanism, and means for manually opening the valve.

6. In a measuring machine, a storage-tank, a receiving-tank, a valve for controlling the liquid in the storage-tank, a cut-off lever associated with the valve, tripping mechanism for automatically closing the valve, wheels mounted for rotation within the receiving tank, an endless belt engaging the wheels and provided with spaced buckets, said belt being operated by the weight of the liquid for actuating the tripping mechanism, and means for manually opening the valve.

7. In a measuring machine, a storage-tank, a receiving-tank, a valve for controlling the flow of liquid in the storage-tank, a cut-off lever operatively connected with the valve, means for locking the valve in open position, wheels mounted for rotation within the receiving tank, and an endless belt engaging the wheels and provided with spaced buckets, said belts being actuated by the weight of the liquid for automatically releasing the locking means thereby to permit the valve to be moved to closed position.

8. In a measuring machine, a storage-tank, a receiving-tank, a valve for controlling the liquid in the storage-tank, a cut-off lever operatively connected with the valve, a spring latch adapted to engage the cut-off lever for locking the valve in open position, a flexible endless conveyer operable by the weight of the liquid for releasing the locking means, and a spring connected to one end of the cut-off lever for automatically returning the valve to closed position when the locking means is released.

9. In a measuring machine, a storage-tank, a receiving tank, a valve for controlling the liquid in the storage-tank, a cut-off lever operatively connected with the valve, a spring latch adapted to engage the cut-off lever for locking the valve in open position, a disk having a lug secured thereto and adapted to engage the spring latch for automatically releasing the cut-off lever, and an endless carrier actuated by the weight of the liquid for rotating the disk.

10. In a measuring machine, a storage-tank, a receiving-tank, a valve for controlling the liquid in the storage-tank, a cut-off lever operatively connected with the valve, a disk mounted for rotation within the receiving-tank, a spring latch spaced from one side of the disk and adapted to engage the cut-off lever for locking the valve in open position, a lug extending laterally from the disk and adapted to engage the latch for releasing the latter thereby to permit the valve to move to closed position, an endless carrier provided with a series of buckets and actuated by the weight of the liquid for rotating the disk, and a nozzle for directing the liquid from the storage-tank into said buckets.

11. In a measuring machine, a storage-tank, a receiving-tank, a valve for controlling the liquid in the storage-tank and provided with a laterally extending pin, a cut-off lever having its intermediate portion pivoted and one end thereof provided with an elongated slot for the reception of the pin, a spring latch adapted to engage the free end of the cut-off lever for locking the valve in open position, a disk mounted for rotation in the receiving-tank, a cam carried by the disk and adapted to engage the latch for releasing the latter from engagement with the cut-off lever, a spring for automatically closing the valve when the latch is released, and means operable by the weight of the liquid for rotating the disk.

12. In a measuring machine, a storage-tank, a receiving tank, a valve for controlling the flow of liquid in the storage-tank, a cut-off lever operatively connected with the valve, a locking member adapted to engage the adjacent end of the cut-off lever for locking the valve in open position, a pair of spaced revoluble disks one of which is provided with a laterally extending lug adapted to engage the locking member for automatically releasing the cut-off lever, a cable connecting said disks, and means actuated by the weight of the liquid for imparting movement to the lug carrying disk.

13. In a measuring machine, a storage-tank, a receiving-tank, a valve for controlling the liquid in the storage-tank, a cut-off lever operatively connected with the valve, a locking member adapted to engage the adjacent end of the cut-off lever for locking the valve in open position, a shaft provided with a worm-wheel, a disk loosely mounted on the shaft, spaced sprocket-wheels mounted for rotation in the receiving-tank, an endless carrier engaging the sprocket-wheel and actuated by the weight of the liquid, a shaft operatively connected with one of the sprocket-wheels and provided with a worm meshing with the worm-wheel, a ratchet-wheel carried by the disk, and a pawl pivotally mounted on the worm-wheel and adapted to engage the teeth on the ratchet-wheel.

14. In a measuring machine, a storage-tank, a receiving-tank, a valve for controlling the liquid in the storage-tank, a cut-off lever operatively connected with the valve and actuated by the weight of the liquid for automatically tripping the cut-off valve thereby to close the valve, spaced revoluble disks provided with peripheral grooves, a belt connecting said disks and seated in the grooves, stationary collars surrounding the disks and provided with a series of graduations adapted to register with indices on the disks, and a handle secured to one of the disks for rotating the same thereby to impart movement to the opposite disk.

In testimony that I claim the foregoing as my own, I have hereto affixed my signature in the presence of two witnesses.

FRANK O. HAGUE.

Witnesses:
  THOMAS C. CLARK,
  C. A. RICHARDSON.